(12) United States Patent
Chao et al.

(10) Patent No.: US 7,697,072 B2
(45) Date of Patent: Apr. 13, 2010

(54) IMAGE DISPLAYING METHOD AND APPARATUS FOR TELEVISION WHEN POWERING ON/OFF

(75) Inventors: Po-Wei Chao, Taipei Hsien (TW); Jin-Sheng Gong, Tao-Yuan Hsien (TW); An-Shih Lee, Hsin-Chu Hsien (TW)

(73) Assignee: Realtek Semicondcutor Corp., HsinChu (TW)

( * ) Notice: Subject to any disclaimer, the term of this patent is extended or adjusted under 35 U.S.C. 154(b) by 967 days.

(21) Appl. No.: 11/425,150

(22) Filed: Jun. 20, 2006

(65) Prior Publication Data

US 2006/0285021 A1  Dec. 21, 2006

(30) Foreign Application Priority Data

Jun. 21, 2005  (TW) ............................... 94120672 A

(51) Int. Cl.
*H04N 5/445* (2006.01)
*H04N 9/74* (2006.01)
*H04N 5/63* (2006.01)

(52) U.S. Cl. .................... 348/564; 348/588; 348/730

(58) Field of Classification Search ......... 348/563–566, 348/569, 584, 588, 589, 598–600, 730, 706; 725/37–41, 43, 59; *H04N 5/445, 5/45, 9/74, H04N 9/76, 5/63, 5/268*
See application file for complete search history.

(56) References Cited

U.S. PATENT DOCUMENTS 5,194,954 A * 3/1993 Duffield ..................... 348/730
5,841,483 A * 11/1998 Shafer ........................ 348/588
6,118,493 A * 9/2000 Duhault et al. .............. 348/564

* cited by examiner

*Primary Examiner*—Sherrie Hsia
(74) *Attorney, Agent, or Firm*—Winston Hsu

(57) ABSTRACT

An image displaying method for a television includes: selecting a portion of a plurality of display regions of a screen of the television to display a still or animated image when a power-on signal is received; and utilizing all the plurality of display regions to display images corresponding to a television signal after a predetermined time period beginning from when the power-on signal is received. The present invention further discloses an image displaying method for a television, including: selecting a portion of a plurality of display regions of a screen of the television and stopping the displaying of images corresponding to a television signal on the selected display regions when a power-off signal is received; and stopping the displaying of images corresponding to the television signal on all the plurality of display regions after a predetermined time period beginning from when the power-off signal is received.

20 Claims, 5 Drawing Sheets

IMAGE DISPLAYING METHOD AND APPARATUS FOR TELEVISION WHEN POWERING ON/OFF

BACKGROUND OF THE INVENTION

1. Field of the Invention

The present invention relates to televisions, and more particularly, to image displaying methods and apparatuses for television when powering on/off.

2. Description of the Prior Art

Televisions are one of the most popular home appliances because they can distribute information and provide entertainment functionalities. Many families have two or even more televisions, and the importance of the television can be seen in view of this.

The television displays images on its screen. In the prior art, however, the operations of the television are monotonous when powering on or powering off.

SUMMARY OF THE INVENTION

It is therefore an objective of the claimed invention to provide image displaying methods and apparatuses for television to provide specific visual effects when powering on the television.

According to an embodiment of the present invention, a method for displaying images on a displaying device when powering on the displaying device is disclosed. The displaying device has a screen being partitioned into a plurality of display regions. The method comprises: selecting a portion of a plurality of display regions of the screen to display a still or animated image when a power-on signal is received; and utilizing all the plurality of display regions to display images corresponding to a displaying signal after a predetermined time period beginning from when the power-on signal is received.

According to an embodiment of the present invention, an image control device for controlling image displaying operations of a television when powering on the television is disclosed. The television has a screen being partitioned into a plurality of display regions. The image control device comprises: a receiving unit for receiving a power-on signal to generate a first control signal; and a processing circuit coupled to the receiving unit and the screen for controlling a portion of the plurality of display regions to display a still or animated image according to the first control signal, and for controlling all the plurality of display regions to display images corresponding to a television signal after a predetermined time period beginning from when the power-on signal is received by the receiving unit.

Another objective of the claimed invention is to provide image displaying methods and apparatuses for television to provide specific visual effects when powering off the television.

According to an embodiment of the present invention, a method for displaying images on a displaying device when powering off the displaying device is disclosed. The displaying device has a screen being partitioned into a plurality of display regions. The method comprises: selecting a portion of a plurality of display regions of the screen and stopping the displaying of images corresponding to a displaying signal on the selected display regions when a power-off signal is received; and stopping the displaying of images corresponding to the displaying signal on all the plurality of display regions after a predetermined time period begin from when the power-off signal is received.

According to an embodiment of the present invention, an image control device for controlling image displaying operations of a television when powering off the television is disclosed. The television has a screen being partitioned into a plurality of display regions. The image control device comprises: a receiving unit for receiving a power-off signal to generate a third control signal; and a processing circuit coupled to the receiving unit and the screen for stopping the displaying of images corresponding to a television signal on a portion of the plurality of display regions according to the third control signal, and for stopping the displaying of the images corresponding to the television signal on all of the plurality of display regions after a predetermined time period beginning from when the power-off signal is received by the receiving unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
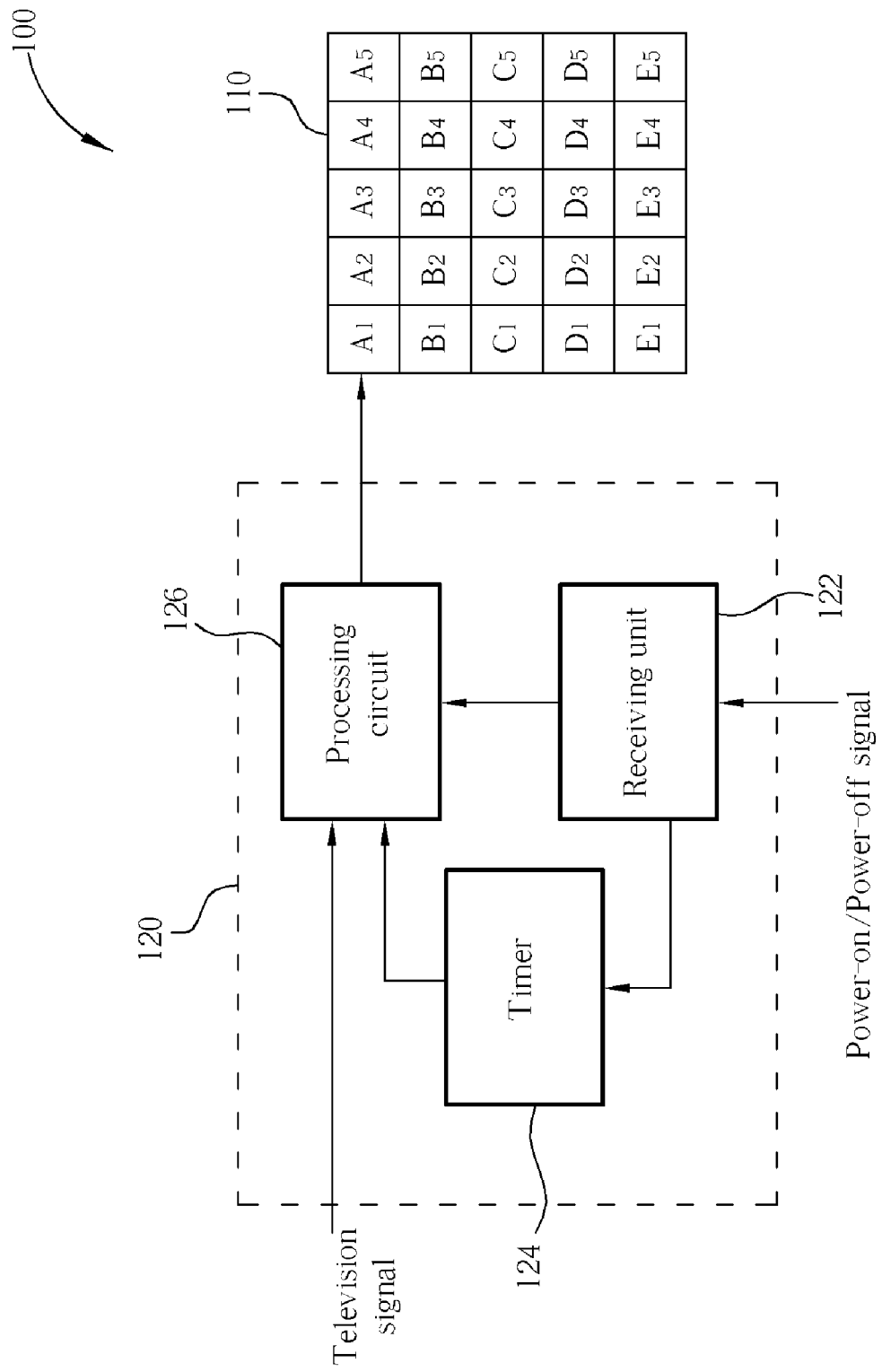
FIG. 1 is a simplified block diagram of a television according to one embodiment of the present invention.

Please refer to FIG. 1, which shows a simplified block diagram of a television 100 according to one embodiment of the present invention. As shown, the television 100 comprises a screen 110 and an image control device 120. The screen 110 may be a CRT display, an LCD, a PDP, an LED display, or any other visual output device. In this embodiment, the screen 110 is partitioned into a plurality of display regions, such as the twenty-five display regions denoted as $A_1$~$A_5$, $B_1$~$B_5$, $C_1$~$C_5$, $D_1$~$D_5$, and $E_1$~$E_5$ shown in FIG. 1. In addition, the image control device 120 of this embodiment comprises a receiving unit 122, a timer 124, and a processing circuit 126. Preferably, the television 100 is a digital television. Hereinafter, operations of the television 100 will be explained with reference to FIG. 2.

Figure 2:
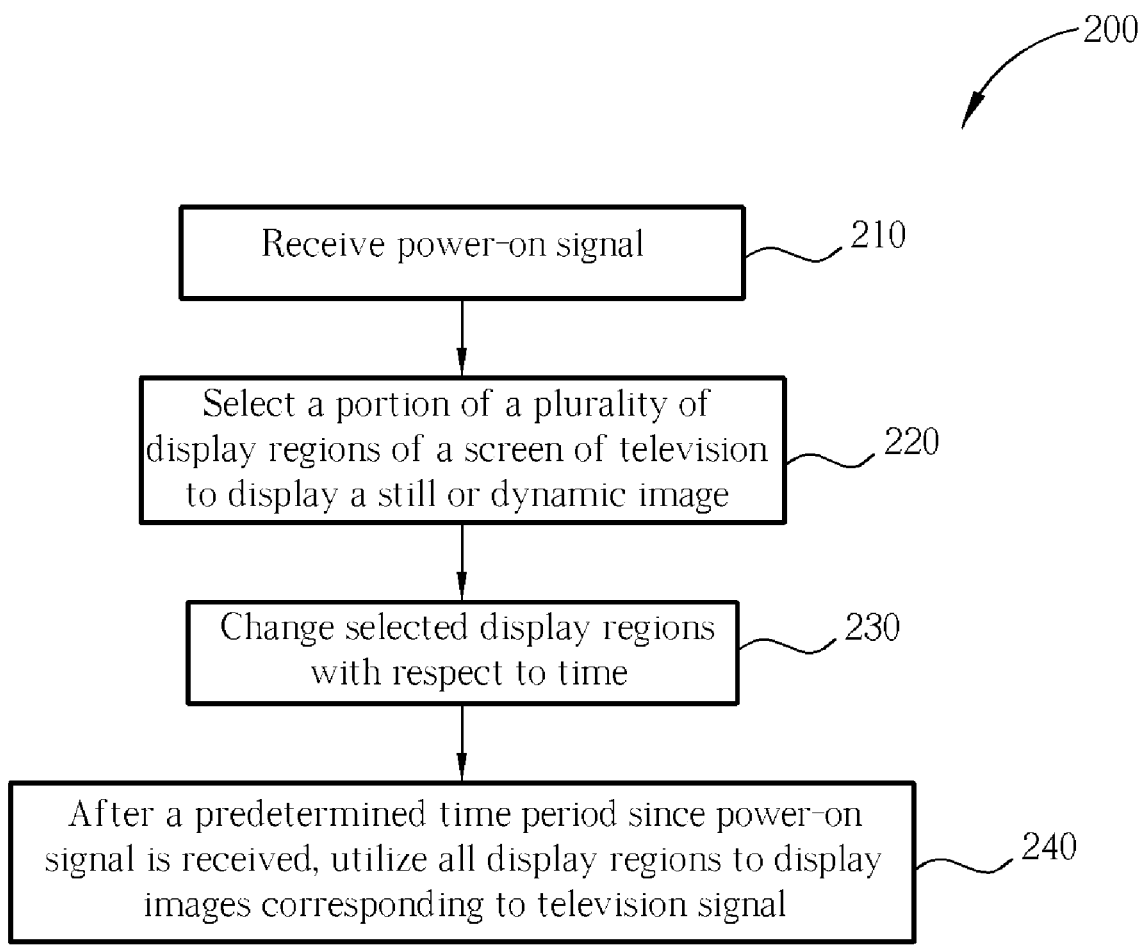
FIG. 2 is a flowchart illustrating a method for displaying images on a television when powering on according to one embodiment of the present invention.

FIG. 2 is a flowchart 200 illustrating a method for displaying images on a television when powering on according to one embodiment of the present invention. The steps of the flowchart 200 are described in detail below.

In step 210, the receiving unit 122 of the image control device 120 receives a power-on signal. Note that the term "power-on signal" as used herein encompasses electromagnetic pulses, wireless communication signals, wired communication signals, vocal commands, or specific sounds. For example, the power-on signal may be a wireless communication signal, such as an infrared signal, an RF signal an UWB signal and so on, produced from a remote control of the television 100 when the user presses the "power key" of the remote control. Alternatively, the power-on signal may be an electromagnetic pulse trigged from a control button of the television 100 when pressed by the user. In addition, the power-on signal may be a vocal command made by the user for commanding the television 100 to turn on, such as "TV ON" or "Turn On TV," or some specific sounds, such as a clap, a fillip voice or the like. In practice, the power-on signal can also be realized by other signal types and is not limited in the aforementioned sound waves, optical waves, or electric waves.

In practice, the receiving unit 122 can be realized by a circuit or device capable of receiving, identifying, or interpreting the aforementioned power-on signal. For example, the receiving unit 122 may be an infrared receiver, a wireless signal receiver, a microphone cooperating with a voice identifying circuit, etc. In this embodiment, when the receiving unit 122 receives the power-on signal, the receiving unit 122 generates a corresponding first control signal to the processing circuit 126 so that the processing circuit 126 begins to perform step 220. Additionally, the receiving unit 122 further generates an indication signal to enable the timer 124 to count time when the power-on signal is received.

Subsequently, in step 220, the processing circuit 126 selects a portion of the plurality of display regions of the screen 110 to display a still image or an animated image. As described previously, the processing circuit 126 begins to perform step 220 when it receives the first control signal from the receiving unit 122. In one aspect, the operations of step 220 are started when the receiving unit 122 receives the power-on signal. In practical implementations, the processing circuit 126 may synchronously enable the displaying operations of the selected portion of display regions or the processing circuit 126 may enable the displaying operations of the portion of display regions according to a predetermined order. The image displayed on the portion of display regions may be a still image, such as a predetermined drawing or picture, or an animated image corresponding to a television signal being a composite video signal received by the processing circuit 126.

On the other hand, the processing circuit 126 may disable the displaying functions of the remaining display regions other than the already selected portion of display regions so that each of the remaindering display regions displays a block picture. Alternatively, the processing circuit 126 may mask the remaindering display regions by utilizing a masking method to provide a mosaic effect. Thereto, the processing circuit 126 may display a predetermined image on the remaindering display regions, such as a single-color background. As a result, the user can easily distinguish the displaying behaviors of the selected portion of display regions from the remaining display regions.

In step 230, the processing circuit 126 changes the selected portion of display regions with respect to time. The processing circuit 126 may select different display regions to display the still or animated image, or may adjust the components of the selected portion of display regions according to a regular pattern.

Figure 3:
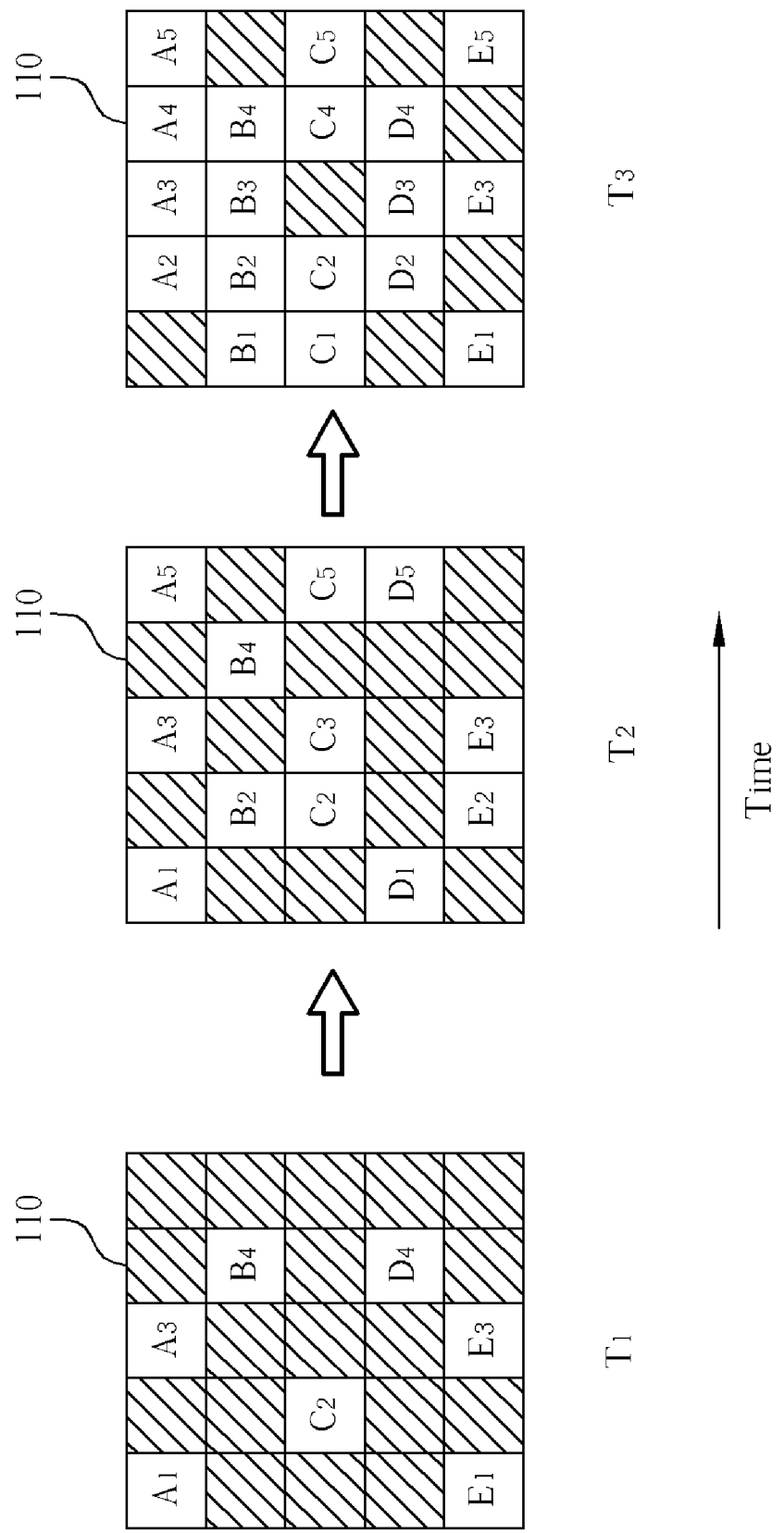
FIG. 3 is a time line diagram showing displaying operations of a screen of FIG. 1 when powering on according to one embodiment of the present invention.

FIG. 3 is a time line diagram showing displaying operations of the screen 110 when powering on the television 100 according to one embodiment of the present invention. As shown in FIG. 3, the processing circuit 126 selects seven display regions $A_1$, $A_3$, $B_4$, $C_2$, $D_4$, $E_1$, and $E_3$ to display images at a time point $T_1$ (e.g., at step 220). In this embodiment, the processing circuit 126 changes the selected display regions with respect to the times $T_1$, $T_2$, and $T_3$ and progressively increases the number of selected display regions. For example, at a subsequent time point $T_2$, the processing circuit 126 instead selects twelve display regions $A_1$, $A_3$, $A_5$, $B_2$, $B_4$, $C_2$, $C_3$, $C_5$, $D_1$, $D_5$, $E_2$, and $E_3$ of the screen 110 to display images. Afterward, at a time point $T_3$, the processing circuit 126 further increases the number of selected display regions to eighteen as shown in FIG. 3. Note that the number and combination of display regions being selected by the processing circuit 126 at each of the above time points is merely an example rather than a restriction of the practical applications of the present invention.

In step 240, the processing circuit 126 utilizes all of the plurality of display regions of the screen 110 to display images corresponding to a television signal after a first predetermined time period, such as a couple of seconds, after the power-on signal is received by the receiving unit 122. The first predetermined time period may be fixed or adjustable. As in the descriptions of step 210, the receiving unit 122 generates an indication signal to enable the timer 124 to count a time period beginning when the power-on signal is received. Before the timer 124 counts to the first predetermined time period, i.e., during the first predetermined time period, the processing circuit 126 repeatedly performs steps 220 and 230. At the time that the timer 124 counts to the first predetermined time period, the timer 124 generates a second control signal to notify or trigger the processing circuit 126 to utilize all display regions of the screen 110 to display images.

According to the foregoing descriptions, it can be appreciated that when the television 100 receives the power-on signal, not all the display regions of the screen 110 are immediately employed or enabled to display images. Instead, the television 100 only utilizes or enables a portion of display regions of the screen 110 to display images when the power-on signal is just received. After a specific period (e.g., the first predetermined time period) after the power-on signal is received, the television 100 displays the entirety of the images on the screen 110. During the specific period, the processing circuit 126 controls the screen 110 to perform the aforementioned displaying operations to present visual effects different from the prior art.

Figure 4:
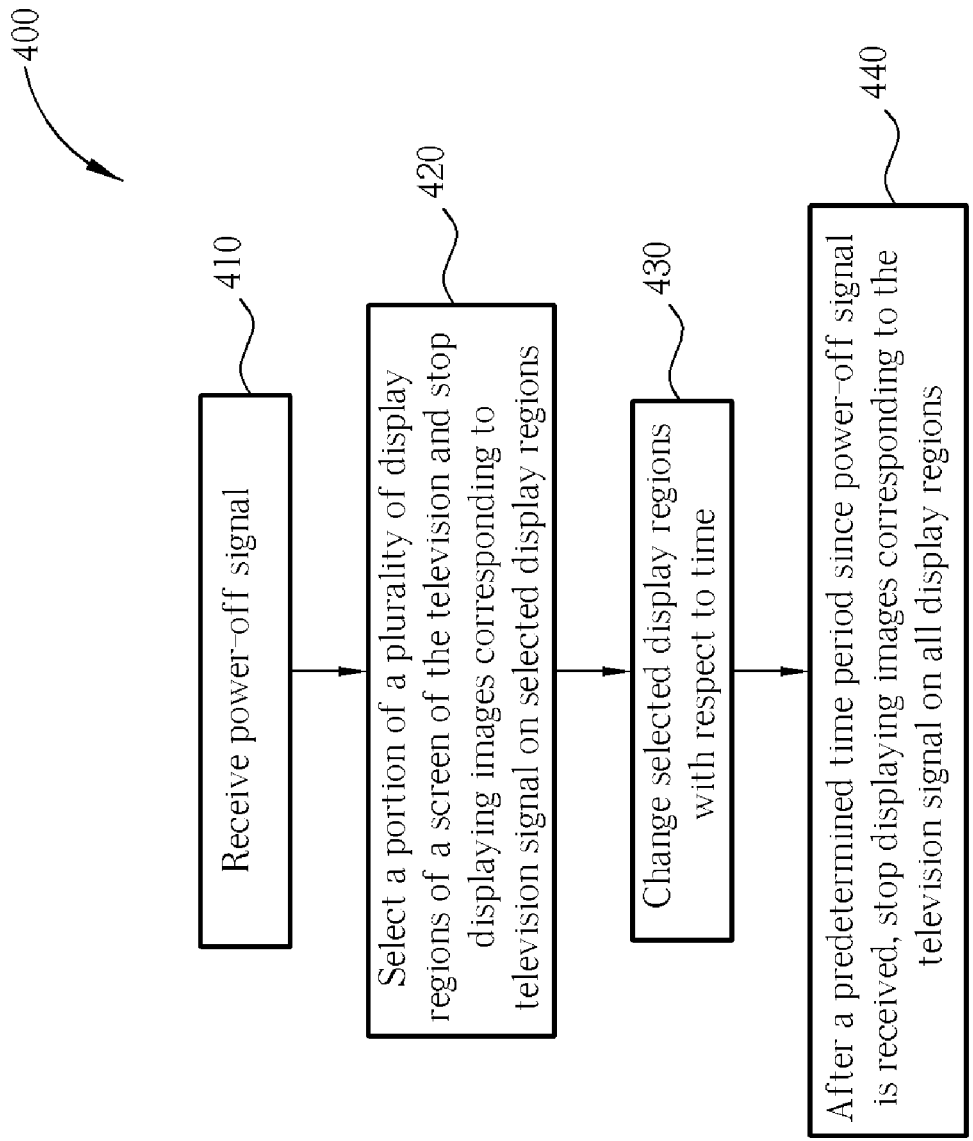
FIG. 4 is a flowchart illustrating a method for displaying images on a television when powering off according to one embodiment of the present invention.

Please refer to FIG. 4, which shows a flowchart 400 illustrating a method for displaying images on a television when powering off according to one embodiment of the present invention. The steps of the flowchart 400 will be described in detail below.

In step 410, the receiving unit 122 of the image control device 120 receives a power-off signal. Similar to the aforementioned power-on signal, the term "power-off signal" as used herein encompasses electromagnetic pulses, wireless communication signals, wired communication signals, vocal commands, specific sounds, or other signal types. When the receiving unit 122 receives the power-off signal, the receiving unit 122 generates a corresponding third control signal to the processing circuit 126 so that the processing circuit 126 begins to perform step 420. Additionally, the receiving unit 122 further generates an indication signal to enable the timer 124 to count time when the power-off signal is received.

In step 420, the processing circuit 126 selects a portion of the plurality of display regions of the screen 110 and stops displaying images on the selected display regions. Similarly, the operations of step 420 can be regarded as to begin when the receiving unit 122 receives the power-off signal. In operations, the processing circuit 126 may synchronously disable displaying operations of the selected portion of display regions or may disable these display regions according to a predetermined order. At that moment, the remaining display regions other than the selected portion of display regions continue their normal image displaying operations.

In step 430, the processing circuit 126 changes the selected portion of display regions with respect to time. In practice, the processing circuit 126 may randomly change the selected display regions, or may adjust the components of the selected portion of display regions according to a regular pattern.

Figure 5:
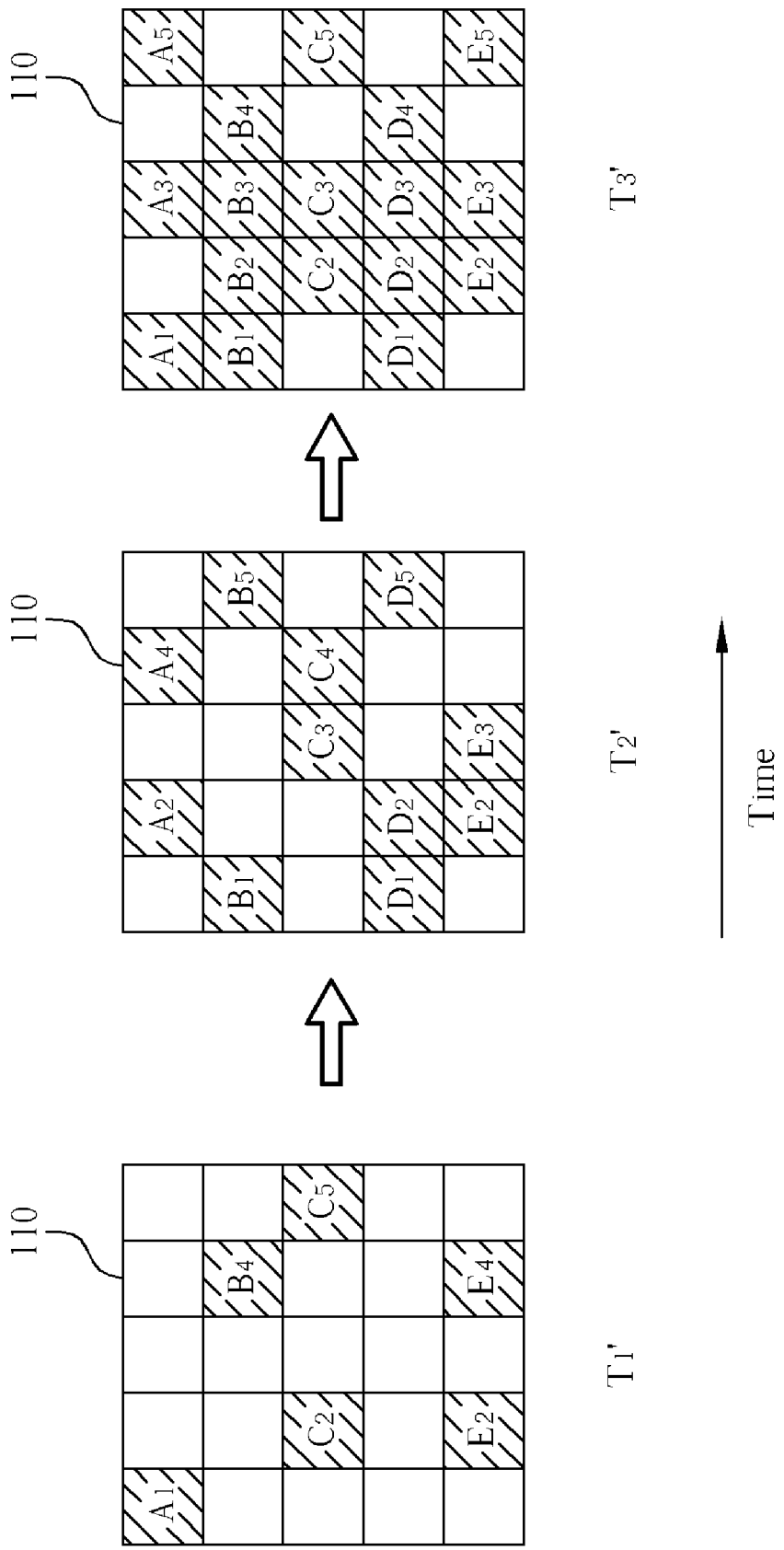
FIG. 5 is a time line diagram showing displaying operations of a screen of FIG. 1 when powering off according to one embodiment of the present invention.

FIG. 5 is a time line diagram showing displaying operations of the screen 110 when powering off the television 100 according to one embodiment of the present invention. As shown in FIG. 5, the processing circuit 126 selects six display regions $A_1$, $B_4$, $C_2$, $C_5$, $E_2$, and $E_4$ and stops the displaying operations of these selected display regions at a time point $T_1'$ (e.g., at step 420). In this embodiment, the processing circuit 126 changes the selected display regions with respect to the times and progressively increases the number of selected display regions. For example, at a following time point $T_2'$, the processing circuit 126 instead selects eleven display regions $A_2$, $A_4$, $B_1$, $B_5$, $C_3$, $C_4$, $D_1$, $D_2$, $D_5$, $E_2$, and $E_3$ of the screen 110 and stops the displaying operations of these eleven display regions. Afterward, at a time point $T_3'$, the processing circuit 126 further increases the number of selected display regions to seventeen as shown in FIG. 5. Note that the number and combination of display regions been selected by the processing circuit 126 at each of the above time points is merely an example rather than a restriction of the practical applications.

In step 440, the processing circuit 126 stops displaying images on all the plurality of display regions of the screen 110 after a second predetermined time period, such as a couple of seconds, after the power-off signal is received by the receiving unit 122. The second predetermined time period may be fixed or adjustable. As in the descriptions of step 410, the receiving unit 122 generates an indication signal to enable the timer 124 to count time when the power-off signal is received. Before the timer 124 counts to the second predetermined time period, i.e., during the second predetermined time period, the processing circuit 126 repeatedly performs steps 420 and 430. At the time that the timer 124 counts to the second predetermined time period, the timer 124 generates a fourth control signal to notify or trigger the processing circuit 126 to stop or disable the displaying operations of all display regions of the screen 110.

In other words, the television 100 does not immediately stop displaying images on all of the display regions of the screen 110 when it receives the power-off signal. Instead, the television 100 only stops or disables the displaying operations of a portion of display regions of the screen 110 when the power-off signal is just received, but continues the normal displaying operations of the remaining display regions. After a specific period (e.g., the second predetermined time period) after the power-off signal is received, the television 100 stops the displaying operations of all display regions of the screen 110. During the specific period, the processing circuit 126 controls the screen 110 to perform aforementioned displaying operations to gradually close the television images displayed on the screen 110.

Note that the screen 110 being partitioned into twenty-five display regions is merely for the purpose of explanatory convenience rather than a limitation of the practical applications. In practice, the number of display regions of the screen 110 is not limited to a specific value. Additionally, the size or shape of each display region of the screen 110 can be adjusted depending on the design choice and is not limited to a specific pattern.

In the foregoing embodiments, the image control device 120 integrates the functionalities of both the power-on control and power-off control. This is merely an example rather than a restriction of the present invention. In fact, the image displaying operations when powering on the television 100 and the image displaying operations when powering off the television 100 may be controlled by separate circuits or chips. In addition, respective blocks of the image control device 120 are functional blocks employed for illustrating the operations of the image control device 120. These functional blocks can be implemented by distinct circuits or can be integrated into a single chip. It should be appreciated by those of ordinary skill in the art that the functionalities of the image control device 120 could be realized by a processor, which executes a proper-programmed firmware.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for displaying images on a displaying device when powering on the displaying device, wherein the displaying device having a screen being partitioned into a plurality of display regions, the method comprising:

selecting a portion of a plurality of display regions of the screen to display a still or animated image when a power-on signal is received; and utilizing all the plurality of display regions to display images corresponding to a displaying signal after a predetermined time period beginning from when the power-on signal is received.

2. The method of claim 1, further comprising:

selecting different display regions to display the still or animated image during the predetermined time period.

3. The method of claim 1, wherein the step of selecting a portion of the plurality of display regions of the screen to display the still or animated image further comprises:

enabling the portion of display regions to display the still or animated image according to a predetermined order.

4. The method of claim 1, wherein the step of selecting a portion of the plurality of display regions of the screen to display the still or animated image further comprises:

displaying a predetermined image on remaindering display regions of the screen.

5. The method of claim 1, wherein the displaying device is a television.

6. The method of claim 1, wherein the predetermined time period is adjustable.

7. A method for displaying images on a displaying device when powering off the displaying device, wherein the displaying device having a screen being partitioned into a plurality of display regions, the method comprising:

selecting a portion of a plurality of display regions of the screen and stopping the displaying of images corresponding to a displaying signal on the selected display regions when a power-off signal is received; and stopping the displaying of images corresponding to the displaying signal on all the plurality of display regions after a predetermined time period begin from when the power-off signal is received.

8. The method of claim 7, further comprising:

stopping the displaying of the images corresponding to the displaying signal on different display regions during the predetermined time period.

9. The method of claim 7, wherein the step of stopping the displaying of images corresponding to the displaying signal on the selected display regions further comprises:

disabling the displaying of images corresponding to the displaying signal on the selected display regions according to a predetermined order.

10. The method of claim 7, wherein the predetermined time period is adjustable.

11. An image control device for controlling image displaying operations of a television when powering on the television, wherein the television having a screen being partitioned into a plurality of display regions, the image control device comprising:
- a receiving unit for receiving a power-on signal to generate a first control signal; and
- a processing circuit coupled to the receiving unit and the screen for controlling a portion of the plurality of display regions to display a still or animated image according to the first control signal, and for controlling all the plurality of display regions to display images corresponding to a television signal after a predetermined time period beginning from when the power-on signal is received by the receiving unit.

12. The image control device of claim 11, wherein the processing circuit selects different display regions to display the still or animated image during the predetermined time period.

13. The image control device of claim 11, wherein the processing circuit enables the portion of display regions to display the still or animated image according to a predetermined order.

14. The image control device of claim 11, wherein the processing circuit further controls the remaining display regions of the screen to display a predetermined image while controlling the portion of display regions to display the still or animated image.

15. The image control device of claim 11, wherein the animated image corresponds to the television signal.

16. The image control device of claim 11, further comprising:
- a timer coupled to the receiving unit for generating a second control signal according to an indication signal, the indication signal being generated by the receiving unit when the power-on signal is received;

wherein the processing circuit controls the displaying operations of the screen according to the first and second control signals.

17. An image control device for controlling image displaying operations of a television when powering off the television, wherein the television having a screen being partitioned into a plurality of display regions, the image control device comprising:
- a receiving unit for receiving a power-off signal to generate a first control signal; and
- a processing circuit coupled to the receiving unit and the screen for stopping the displaying of images corresponding to a television signal on a portion of the plurality of display regions according to the first control signal, and for stopping the displaying of the images corresponding to the television signal on all of the plurality of display regions after a predetermined time period beginning from when the power-off signal is received by the receiving unit.

18. The image control device of claim 17, wherein the processing circuit stops displaying the images corresponding to the television signal on different display regions during the predetermined time period.

19. The image control device of claim 17, wherein the processing circuit disables the displaying of the images corresponding to the television signal on the selected display regions according to a predetermined order.

20. The image control device of claim 17, further comprising:
- a timer coupled to the receiving unit for generating a second control signal according to an indication signal, the indication signal being generated by the receiving unit when the power-off signal is received;

wherein the processing circuit controls the displaying operations of the screen according to the first and second control signals.

* * * * *

UNITED STATES PATENT AND TRADEMARK OFFICE
CERTIFICATE OF CORRECTION

| | | |
|---|---|---|
| PATENT NO. | : 7,697,072 B2 | Page 1 of 1 |
| APPLICATION NO. | : 11/425150 | |
| DATED | : April 13, 2010 | |
| INVENTOR(S) | : Po-Wei Chao et al. | |

It is certified that error appears in the above-identified patent and that said Letters Patent is hereby corrected as shown below:

On the title page, item (73), correct the name of the assignee from "Realtek Semicondcutor Corp." to -- Realtek Semiconductor Corp. --.

Signed and Sealed this
Nineteenth Day of April, 2011

David J. Kappos
*Director of the United States Patent and Trademark Office*